(12) United States Patent
Fawaz et al.

(10) Patent No.: US 7,969,878 B2
(45) Date of Patent: Jun. 28, 2011

(54) QUALITY GUARANTEE FOR REAL-TIME APPLICATIONS OVER SHARED NETWORKS

(75) Inventors: Ayman Fawaz, Berkeley, CA (US); Teresa Tung, Berkeley, CA (US); Raghuveer Chereddy, Fremont, CA (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 859 days.

(21) Appl. No.: 11/519,309

(22) Filed: Sep. 11, 2006

(65) Prior Publication Data
US 2007/0253332 A1    Nov. 1, 2007

Related U.S. Application Data

(60) Provisional application No. 60/795,803, filed on Apr. 28, 2006.

(51) Int. Cl.
*H04L 12/26* (2006.01)
(52) U.S. Cl. ............... 370/230.1; 370/323; 370/254; 370/328
(58) Field of Classification Search .......... 370/229–240, 370/252, 253, 254, 328; 455/67.1, 422.1–425.1
See application file for complete search history.

(56) References Cited

U.S. PATENT DOCUMENTS

| | | | |
|---|---|---|---|
| 6,324,165 B1 * | 11/2001 | Fan et al. | 370/232 |
| 2002/0065599 A1 * | 5/2002 | Hameleers et al. | 701/117 |
| 2003/0115321 A1 * | 6/2003 | Edmison et al. | 709/224 |
| 2005/0013316 A1 | 1/2005 | Liao et al. | |
| 2006/0056382 A1 * | 3/2006 | Yamada et al. | 370/349 |
| 2006/0187885 A1 * | 8/2006 | Roy et al. | 370/332 |
| 2006/0227713 A1 * | 10/2006 | Zuberi et al. | 370/241 |

FOREIGN PATENT DOCUMENTS

| | | |
|---|---|---|
| WO | 97/44724 A2 | 11/1997 |
| WO | 00/42805 A1 | 7/2000 |
| WO | 2005/048533 A1 | 5/2005 |

OTHER PUBLICATIONS

Zhai et al., "A call admission and rate control scheme for multimedia support over IEEE 802.11 wireless LANs", 2004, IEEE, pp. 1-8.*
G. Bianchi, "Performance Analysis of the IEEE 802.11 Distributed Coordination Function," IEEE Journal on Selected Areas in Communications, vol. 18, No. 3, Mar. 2000, pp. 535-547.

(Continued)

*Primary Examiner* — Kwang B Yao
*Assistant Examiner* — Kenan Cehic

(57) ABSTRACT

A shared wireless channel may serve real-time traffic and non-real-time traffic. Depending on channel conditions, the real-time traffic may experience variable levels of quality. The present invention contemplates systems and methods for guaranteeing bounded access time for real-time applications in a shared wireless network in the presence of non-real-time traffic. The systems and methods provide mechanisms to adapt to changing characteristics of wireless channels and to maximize throughput of non-real-time traffic while preserving the quality of real-time applications. The systems and methods may be extended generally to provide adaptive control over the delivery of multiple classes of traffic to protect the quality of critical applications over a shared transmission medium, including IEEE 802.11 networks, IEEE 802.16 networks, and DOCSIS networks.

27 Claims, 4 Drawing Sheets

OTHER PUBLICATIONS

C. Coutras, S. Gupta and N. B. Shroff, "Scheduling of Real-Time Traffic in IEEE 802.11 Wireless LANs," Wireless Networks 6, 2000, pp. 457-466.

Y. Kwon, Y. Fang and H. Latchman, "A Novel MAC Protocol With Fast Collision Resolution for Wireless LANs," IEEE INFOCOM, 2003, 10 pages.

S.-C. Lo, G. Lee and W.-T. Chen, "An Efficient Multipolling Mechanism for IEEE 802.11 Wireless LANs," IEEE Trans. Computers, 52(6), 2003, pp. 1-29.

S.-T. Sheu and T.-F. Sheu, "A Bandwidth Allocation/Sharing/Extension Protocol for Multimedia Over IEEE 802.11 Ad Hoc Wireless LANs," IEEE Journal on Selected Areas in Communications, vol. 19, No. 10, Oct. 2001, pp. 2065-2080.

J. L. Sobrinho and A. S. Krishnakumar, "Real-Time Traffic Over the IEEE 802.11 Medium Access Control Layer," Bell Labs Technical Journal, vol. 1, No. 2, 1996, pp. 172-187.

M. Veeraraghavan, N. Cocker and T. Moors, "Support of Voice Services in IEEE 802.11 Wireless LANs," Proc. INFOCOM, 2001, 10 pages.

A. Veres, A. T. Campbell M. Barry, and L.-H. Sun, "Supporting Service Differentiation in Wireless Packet Networks Using Distributed Control," IEEE Journal on Selected Areas in Communications, vol. 19, No. 10, Oct. 2001, pp. 2081-2093.

Y. Xiao, "QoS Guarantee and Provisioning At the Contention-Based Wireless MAC Layer in the IEEE 802.11e Wireless LANs," IEEE Wireless Communications (Special Issue on Voice Over Wireless Local Area Network), vol. 13, Issue 1, Feb. 2006, pp. 14-21.

H. Zhai, X. Chen and Y. Fang, "A Call Admission and Rate Control Scheme for Multimedia Support Over IEEE 802.11 Wireless LANs," to appear in ACM Wireless Networks, (available at http://www.ecel.ufl/edu/zhai/publications/carcwlan-winet.pdf), 13 pages.

H. Zhai, J. Wang and Y. Fang, "Providing Statistical QoS Guarantee for Voice Over IP in the IEEE 802.11 Wireless LANs," IEEE Wireless Communications (Special Issue on Voice Over Wireless Local Area Network), vol. 13, Issue 1, Feb. 2006, pp. 36-43.

Xiang Chen et al.: "Enhancing the IEEE 802.11e in QoS Support: Analysis and Mechanisms," Quality of Service in Heterogeneous Wired/Wireless Networks, 2005, Second International Conference on Orlando, FL., USA Aug. 22-24, 2005, Piscataway, NJ, USA, IEEE, p. 23, XP010859413, ISBN: 0-7695-2423-0.

* cited by examiner

QUALITY GUARANTEE FOR REAL-TIME APPLICATIONS OVER SHARED NETWORKS

CROSS-REFERENCE TO RELATED APPLICATIONS

This application claims the benefit of priority from and hereby incorporates by reference U.S. provisional patent application 60/795,803 filed Apr. 28, 2006 entitled "Quality Guarantee for Real-Time Applications Over IEEE 802.11 Networks."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

According to specific embodiments, this invention is related to data networks, and more specifically to systems and methods for supporting applications with tight delay and bandwidth requirements over data networks.

BACKGROUND

Wireless data networks, such as those using the well-known Institute of Electrical and Eectronics Engineers (IEEE) 802.11 standards, are widely used to connect devices to enterprise networks (such as LANs or WANs) or to the Internet. The IEEE 802.11 standards are designed primarily for the efficient transmission of data. With the increased popularity of voice-over-IP (VoIP) and other real-time applications such as the NetMeeting™ application (from Microsoft Corp.), the need to support these real-time applications over wireless networks, including IEEE 802.11 networks, has become increasingly important.

In a conventional implementation (FIG. 1), an IEEE 802.11 wireless network includes an access point (AP) connected to a wired network. The network also includes a number of devices (or clients), each equipped with an IEEE 802.11 interface. The AP and clients share one wireless channel to exchange packets generated by various applications. The wireless channel may suffer from various impairments such as fading, interference, and attenuation. The wireless transceivers adjust their transmission rate to maintain a low packet error rate. Thus, the AP and clients transmit more slowly when their respective channels are degraded.

The media access control (MAC) protocol regulates the access to the wireless channel. The basic MAC mechanism in IEEE 802.11 networks is collision avoidance. Before transmitting, each device waits for the channel to be idle and then transmits a packet. When a device successfully receives a packet, it immediately sends back an acknowledgment. If a device transmits a packet but does not receive an acknowledgment, the device may determine that its transmission collided with that of another device. The device then calculates a random time and waits until it detects that the channel has been idle for that amount of time before it attempts to transmit its packet again. As the number of active devices increases, so do the likelihood of collision and the typical delay until successful transmission. This delay further increases if some of the devices transmit large packets and if the channel suffers impairments.

The IEEE 802.11e protocol attempts to address limitations of the standard IEEE 802.11 networks. IEEE 802.11e provides differentiated access to the wireless channel by giving some form of favored treatment to certain classes of traffic. The IEEE 802.11e protocol groups packets into different classes and provides differentiated channel access for the different classes. Using that protocol, a device that tries to send a packet of a more urgent class is required to wait a shorter channel idle time before it attempts to transmit; and in the event of a collision, the device chooses a random time that tends to be shorter than the idle time for less urgent classes. Such modifications of the MAC may improve the ability of the network to support critical applications. However, the IEEE 802.11e protocol still suffers from undesirable limitations.

Although IEEE 802.11e modifications improve the ability of the 802.11 networks to support VoIP applications, these improvements still fall short of the characteristics needed in many situations. First, these variations are less effective when a number of clients do not support the modified protocol and are standard 802.11b and/or 802.11g devices. Second, the MAC parameters of IEEE 802.11e indirectly determine the number of acceptable VoIP connections that the network can support but do not enable the network manager to modify the desired operating point. Third, as in any 802.11 network, excessive delays occur when too many devices compete for the channel.

SUMMARY

Embodiments of the present invention relate to the field of data networks, including wireless networks covered by the IEEE 802.11 family of standards that correspond to the industry alliance Wi-Fi. More specifically, embodiments of the present invention improve the support of applications with tight delay and bandwidth requirements such as voice and video. With elementary modifications, embodiments of the present invention may also apply to IEEE 802.16 networks, DOCSIS cable systems, and scheduling of different services over DSL lines.

Systems and methods are disclosed for guaranteeing bounded access time for real-time applications in an IEEE 802.11 network in the presence of non-real-time applications. The disclosed systems and methods are compatible with existing IEEE 802.11 clients and are adaptable to changing characteristics of wireless channels, and they maximize the throughput of non-real-time traffic while preserving the quality of real-time applications. More generally, these systems and methods apply to adaptive control over the delivery of multiple classes of traffic to protect the quality of critical applications.

In view of observations of IEEE 802.11e networks, embodiments of the present invention enable a network of standard 802.11b and/or 802.11g devices to operate without modification of such devices or of the protocols. A network manager may select the desired operating point of the network. That is, the network manager can specify the fraction of the network capacity allocated to critical applications. Alternatively or additionally, the network manager may specify a level of quality of service for critical applications, or the network manager may specify other operating characteristics of the network (e.g., delay and loss metrics) related to transmission of real-time and non-real-time traffic. Moreover, the embodiments of the present invention require modifications only of the access point and are compatible with standard IEEE 802.11 clients that do not support IEEE 802.11e. Embodiments of the present invention may adapt automatically to the variability of the wireless channel, such as by applying an algorithm for adaptive control of the channel. Systems and methods designed in accordance with principles of the present invention generally use direct measurements of the performance of the network (as an alternative to relying on models of the MAC protocol) and adjust operating parameters to maintain the desired performance level.

One embodiment of a method involves measuring the performance of a shared wireless channel by making direct measurements of the number of packets, which may include both critical traffic and non-critical traffic, transmitted during a time period. The shared wireless channel may use an IEEE 802.11 protocol. In some cases, the critical traffic may include probe packets not generated by critical applications. The non-critical traffic may, in some cases, include packets generated by critical applications but transmitted with a lower associated quality of service than for the critical traffic. This embodiment of a method additionally involves making direct measurements of transmission metrics associated with transmission of those packets during the time period. Examples of transmission metrics include delay metrics, loss metrics, and queue occupancy. The direct measurements are made in order to determine residual bandwidth for a subsequent time period. The method further involves adjusting control parameters for transmission of critical traffic and non-critical traffic for the subsequent time period based on the direct measurements. The adjustments to the control parameters are made so as to maintain a quality of service for critical traffic generated by critical applications and to optimize utilization of any residual bandwidth. The adjustment may involve allocating a portion of available bandwidth each to critical applications and to non-critical applications in order to balance traffic based on a measure of fairness or a predetermined allocation. The adjustment may also involve allowing a new critical application to transmit critical packets if its bandwidth requirement is less than or equal to the residual bandwidth for the subsequent time period. The adjustment may further involve adjusting the number of non-critical packets allowed to be sent during the subsequent time period, or it may involve adjusting the number of probe packets to be sent during the subsequent time period.

Another embodiment of a method involves measuring the performance of a shared transmission medium by making direct measurements of the number of packets, which may include both critical traffic and non-critical traffic, transmitted during a time period. The shared transmission medium may be a wired channel or a wireless channel, and may use an IEEE 802.11 protocol, an IEEE 802.16 protocol or a DOCSIS protocol, according to specific embodiments. In this method, the critical traffic includes probe packets not generated by critical applications. In some cases, the non-critical traffic may include packets generated by critical applications but transmitted with a lower associated quality of service than for the critical traffic. The method additionally involves making direct measurements of transmission metrics associated with transmission of those packets during the time period. Examples of transmission metrics include delay metrics, loss metrics, and queue occupancy. The direct measurements are made in order to determine residual bandwidth for a subsequent time period. The method further involves adjusting control parameters for transmission of critical traffic and non-critical traffic for the subsequent time period based on the direct measurements. The adjustments to the control parameters are made so as to maintain a quality of service for critical traffic generated by critical applications and to optimize utilization of any residual bandwidth. The adjustment may involve allocating a portion of available bandwidth each to critical applications and to non-critical applications in order to balance traffic based on a measure of fairness or a predetermined allocation. The adjustment may also involve allowing a new critical application to transmit critical packets if its bandwidth requirement is less than or equal to the residual bandwidth for the subsequent time period. The adjustment may further involve adjusting the number of non-critical packets allowed to be sent during the subsequent time period, or it may involve adjusting the number of probe packets to be sent during the subsequent time period.

One embodiment of a system includes a control module that controls transmission of critical traffic and non-critical traffic over a shared wireless channel. The shared wireless channel may use an IEEE 802.11 protocol. The system also includes a media access control module that transmits packets of critical traffic and non-critical traffic over the shared wireless channel. As before, in some cases, critical traffic includes probe packets not generated by critical applications. Thus, the system may include a probe generator operative to generate these probe packets. In some cases, non-critical traffic includes packets generated by critical applications but transmitted with a lower associated quality of service than for critical traffic. In this embodiment, the system further includes an update module that makes direct measurements of the performance of the shared wireless channel during a time period in order to determine residual bandwidth for a subsequent time period, and adjusts control parameters used by the control module during the subsequent time period in order to maintain a quality of service for critical traffic generated by critical applications and to optimize utilization of any residual bandwidth. The update module makes directs measurements, including measurements of the number of packets transmitted during the time period as well as measurements of transmission metrics associated with transmission of those packets during the time period. Examples of transmission metrics include delay metrics, loss metrics, and queue occupancy. The update module adjusts control parameters for transmission of critical traffic and non-critical traffic for a subsequent time period. These adjustments may include allocating a portion of available bandwidth each to critical applications and to non-critical applications in order to balance traffic based on a measure of fairness or a predetermined allocation. These adjustments may also include allowing a new critical application to transmit critical packets if its bandwidth requirement is less than or equal to the residual bandwidth for the subsequent time period. These adjustments may further include adjusting a number of non-critical packets allowed to be sent during the subsequent time period, or they may include adjusting the number of probe packets to be sent during the subsequent time period.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF SPECIFIC EMBODIMENTS OF THE INVENTION

In the following detailed description, reference is made to the accompanying drawings in which are shown by way of illustration a number of embodiments and the manner of practicing the invention. It is to be understood that other embodiments may be utilized and structural changes may be made without departing from the scope of the present invention.

Figure 1:
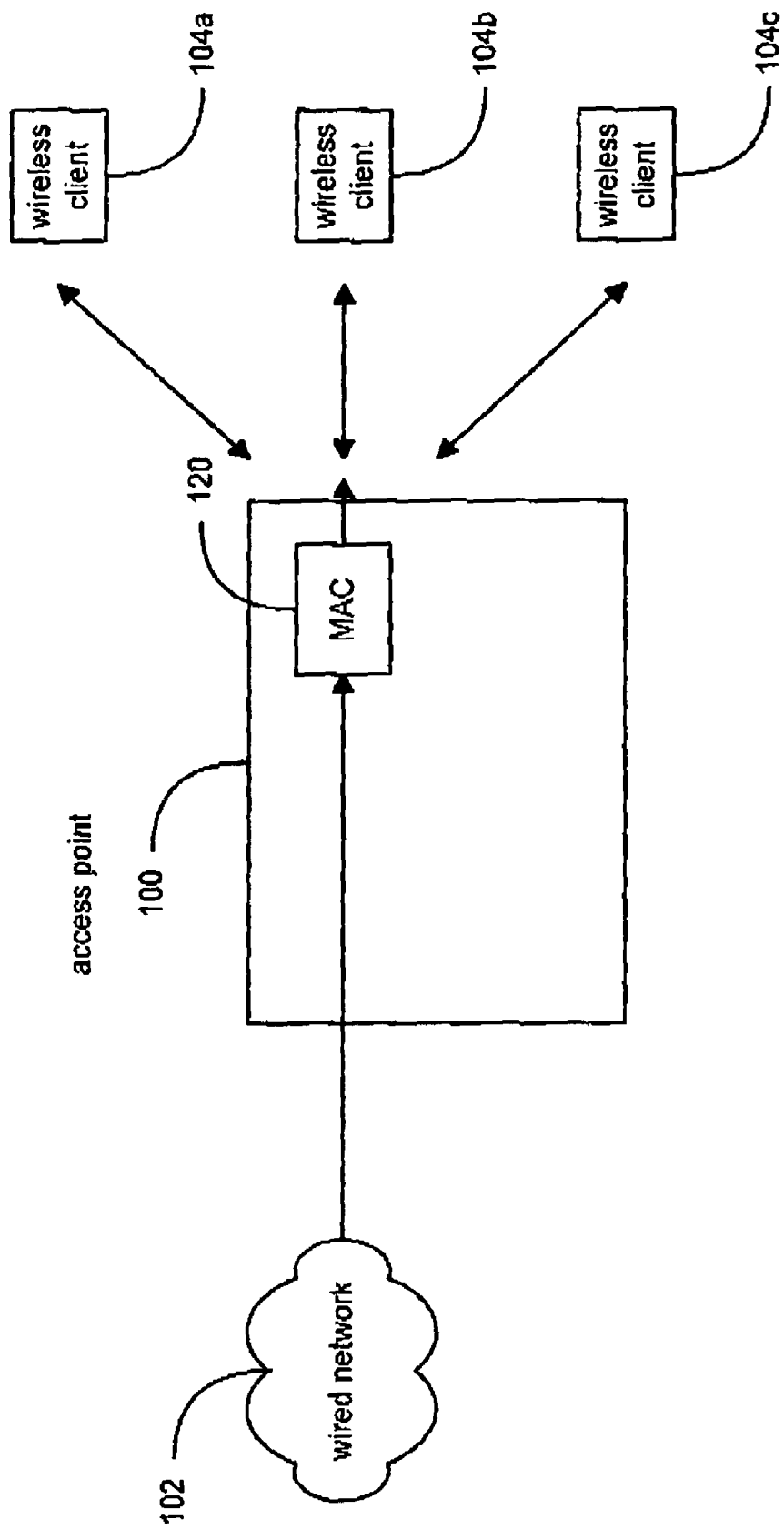
FIG. 1 illustrates a prior art system for providing access to a wireless channel.

The system in FIG. 1 was previously discussed to provide some context and details of the field of the invention and we mention it again here just briefly. FIG. 1 illustrates a conventional system for providing access to a wireless channel. This system includes an access point 100 which is communicatively coupled to a wired network 102 and is further coupled to wireless clients 104a, 104b, and 104c (hereinafter each identified as wireless client 104) to provide access to the wired network 102. The access point 100 comprises media access control (MAC) module 120. The basic mechanism employed by the MAC is collision avoidance, and this mechanism has an inherent delay from waiting for the shared transmission medium to be idle.

Figure 2:
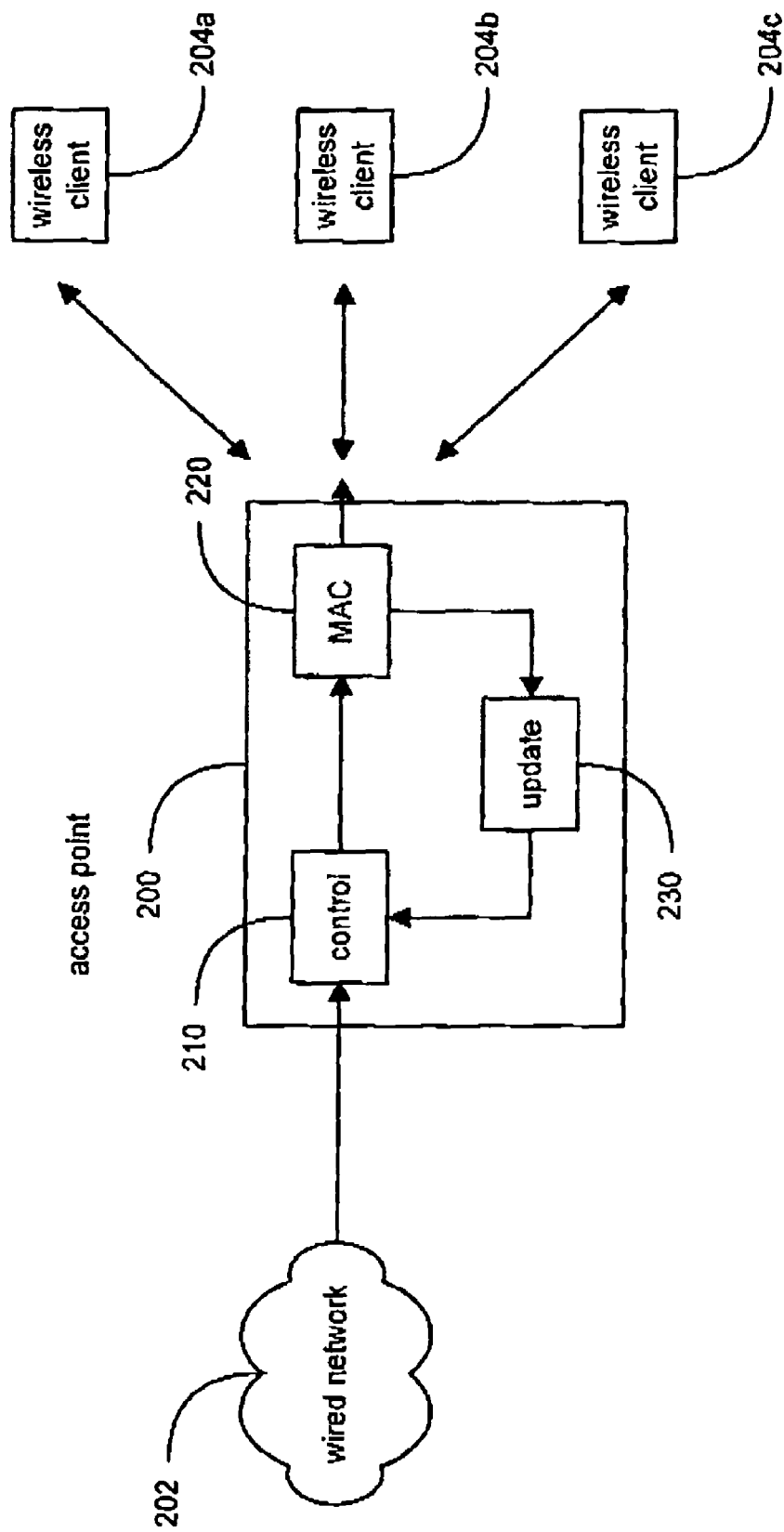
FIG. 2 illustrates a system for providing access to a wireless channel using adaptive control.

In accordance with principles of the present invention, FIG. 2 illustrates one embodiment of a system for providing access to a wireless channel using adaptive control to substantially avoid such deficiency. According to FIG. 2, an access point 200 is communicatively coupled to a wired network 202 and is further communicatively coupled to wireless clients 204a, 204b, 204c (hereinafter each identified as wireless client 204) to provide access to wired network 202. In the embodiment of FIG. 2, access point 200 comprises control module 210, media access control (MAC) module 220, and update module 230. Control module 210 is communicatively coupled to MAC module 220 and to update module 130. MAC module 220 is communicatively coupled to control module 210 and to update module 230. Update module 230 is communicatively coupled to control module 210 and to MAC module 220. In FIG. 2, only the traffic sent by the access point 200 to the clients is shown.

Briefly, the access point 200 implements an adaptive control over the traffic it sends to the wireless clients 204. More specifically, the control module 210 controls traffic sent to the wireless clients 204 via the MAC module 220. The control module 210 performs adaptive control by using adjusted parameters based on measurements of the performance of the MAC module 220 and of the wireless channel. The MAC module 220 transmits packets to the wireless clients 204 based on the control parameters established by control module 210. The update module 230 measures the performance of the MAC module 220 and supplies the control module 210 with updated control parameters.

In one embodiment, the wireless clients 204 communicate with access point 200 using standard wireless networking protocols, such as IEEE 802.11b and 802.11g. Access point 200 transports packets from critical and non-critical applications. The control module 210 maintains the quality of critical applications even in the presence of non-critical applications.

In this context, a critical application is one that requires most of its packets to be transported by the wireless network within a delay not exceeding some small time value, such as 20 ms or 40 ms. Representative critical applications are voice-over-IP (VoIP) and videoconferencing applications. Control applications in industrial automation or other fields are other examples of critical applications. Critical applications may use the User Datagram Protocol (UDP) and may generate fixed-size packets periodically. An application is non-critical if it does not place such tight delay requirements on the delivery of its packets. Representative non-critical applications are email and web browsing applications. These applications may use the Transmission Control Protocol (TCP).

Figure 3:
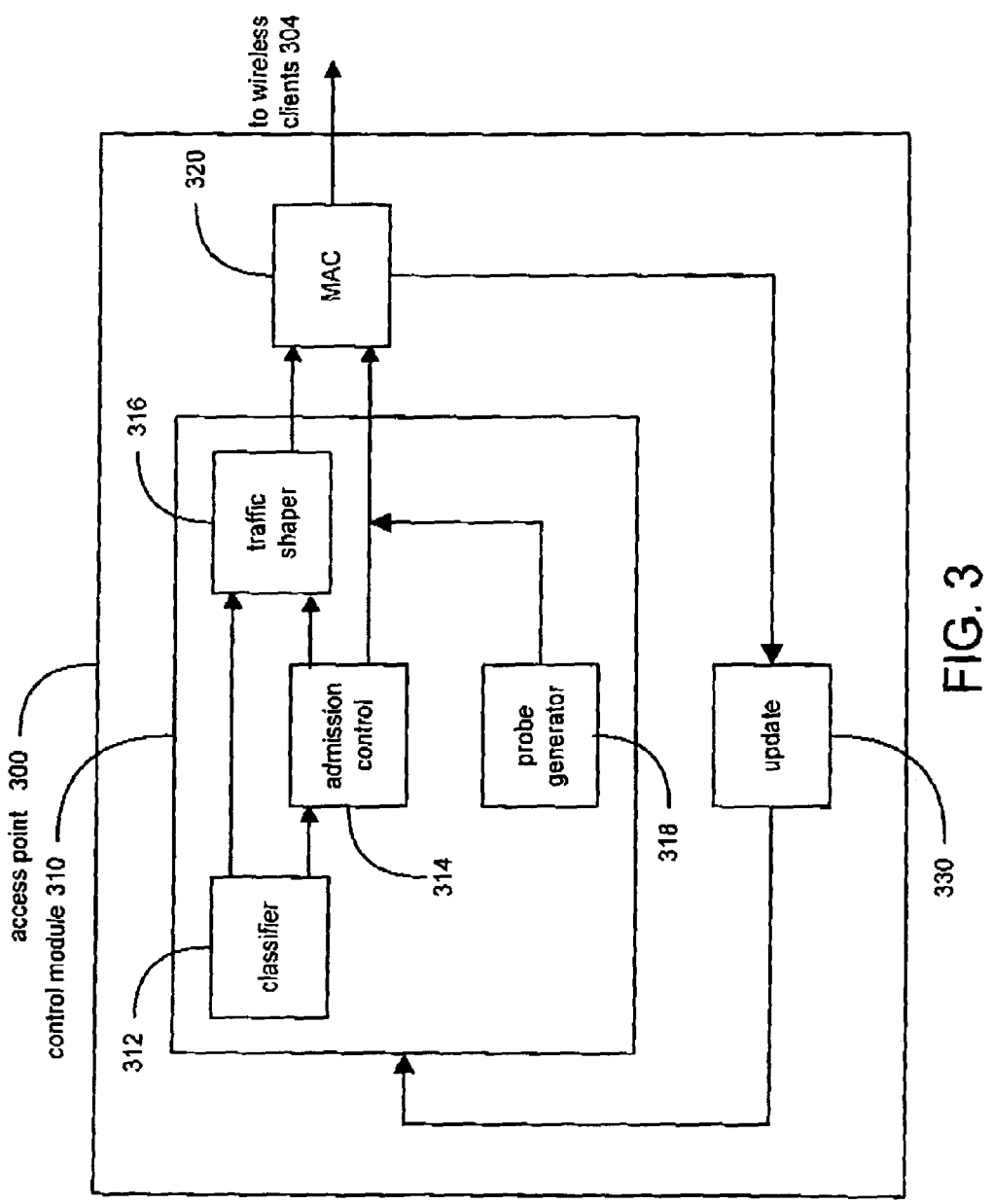
FIG. 3 illustrates an access point, including a detailed view of a control module, according to a specific embodiment.

FIG. 3 illustrates an embodiment of an access point, including a detailed view of a control module. According to FIG. 3, an access point 300 comprises a control module 310, a media access control (MAC) module 320, and an update module 330. Control module 310 is communicatively coupled to MAC module 320 and to update module 330. MAC module 320 is communicatively coupled to control module 310 and to update module 330. Update module 330 is communicatively coupled to control module 310 and to MAC module 320.

As shown, control module 310 includes a classifier 312, an admission control module 314, a traffic shaper 316, and a probe generator 318. Classifier 312 is communicatively coupled to admission control module 314, traffic shaper 316, and MAC module 320. Admission control module 314 is communicatively coupled to classifier 312 and to traffic shaper 316. Traffic shaper 316 is communicatively coupled to classifier 312 and to MAC module 320. Probe generator 318 is communicatively coupled to MAC module 320.

Briefly, the access point 300 implements an adaptive control over the traffic it sends to wireless clients 304. More specifically; the control module 310 controls traffic sent to the wireless clients 304 via the MAC module 320. The control module 310 performs adaptive control by using adjusted parameters based on direct measurements of the performance of the MAC module 320 and of the wireless channel. The MAC module 320 transmits packets to the wireless clients 304 based on the control parameters established by control module 310. The update module 330 measures the performance of the MAC module 320 and supplies the control module 310 with updated control parameters.

In operations, the control module 310 performs its functions in successive periods of time, or epochs, of T seconds each. The value of T is selected to correspond to meaningful statistics, where a representative value of T is one. The classifier 312 identifies packets as critical packets or non-critical packets, and the admission control module 314 determines which critical applications it can admit. If a critical application is admitted by admission control module 314, then its critical packets are sent to a high-priority queue of the MAC module 320 for transmission. The admission control module 314 operates with a parameter R, which is an estimate of the capacity of the channel (i.e., measure of the residual bandwidth available in terms of the number of critical transmissions possible per T). The admission control module will admit a new critical application having a bandwidth requirement of K (in terms of the number of critical transmissions possible per T) only if K is less than the estimated capacity of the channel R. The traffic shaper 316 receives non-critical packets from classifier 312 as well as non-admitted critical packets from admission control module 314. The traffic shaper 316 determines which of these low-priority packets to send to a low-priority queue of the MAC module 320 for transmission. The traffic shaper 316 operates with a parameter M, in that the traffic shaper 316 sends M low-priority packets to the MAC module 320 every T seconds. The probe generator 318 generates probe packets that are sent to the MAC as high-priority packets. The probe generator operates with a parameter P in that it sends P high-priority probe packets to the MAC every T seconds, but only when the high-priority queue of the MAC is empty.

As discussed, the MAC module 320 serves the admitted critical packets and the probe packets with high priority and it serves all the other packets with low priority. Thus, in this embodiment, the system may carry non-admitted critical applications with a lower quality, if the users operating wireless clients 304 accept this service.

The update module 330 is part of a feedback loop that adjusts the control parameters M, P, and R of the control module 310. In operations of the update module 330, it monitors the number M' of low-priority packets (including both non-critical packets and non-admitted critical packets) and the number P' of probe packets that the MAC module 320 actually transmitted during the previous T-second epoch. The update module 330 also counts the number D of high-priority packets (including both admitted critical packets and probe packets) that experienced a delay that exceeds t seconds during that epoch. A typical value of t is 10 ms.

Having made the direct measurements of M', P', and D, the update module 330 utilizes an algorithm to update the control parameters M, P, and R. The basic idea is that if $M' \geq M$ and $D=0$, then the access point should be able to transmit the high-priority packets plus the quota of M low-priority packets. In such a situation, the algorithm increases M, so that the number of low-priority packets that can be sent from the access point 300 is increased for the next T second epoch.

Moreover, since the access point 300 can send M' low-priority packets and P' high-priority probe packets, it could send instead $N=M'+\frac{1}{2}P'$ additional admitted critical packets. That is, the admission control module 314 may admit additional critical packets to be sent to the high-priority queue of the MAC module 320. Given that $D=0$, the access point 300 can successfully send M' low-priority packets plus P' high-priority probe packets. These packets typically generate M' other packets from wireless clients 304 (as part of TCP connections). The P' probe packets do not generate additional packets of traffic from wireless clients 304. The transmission of the M' low-priority packets and the P' high-priority probe packets corresponds to a total load of 2 M'+P' packets on the channel. Since critical applications tend to generate symmetric traffic (i.e., if the access point 300 sends N critical packets, the wireless clients 304 typically respond by sending N other critical packets), transmission of an additional $N=M'+\frac{1}{2}P'$ admitted critical packets would result in a channel load of 2 $N=2M'+P'$ packets. These packets would take the place of the M' low-priority packets and the P' high-priority probe packets. Accordingly, $M'+\frac{1}{2}P'$ is a measure of the available capacity. The update module 330 calculates R as $M'+\frac{1}{2}P'$.

Figure 4:
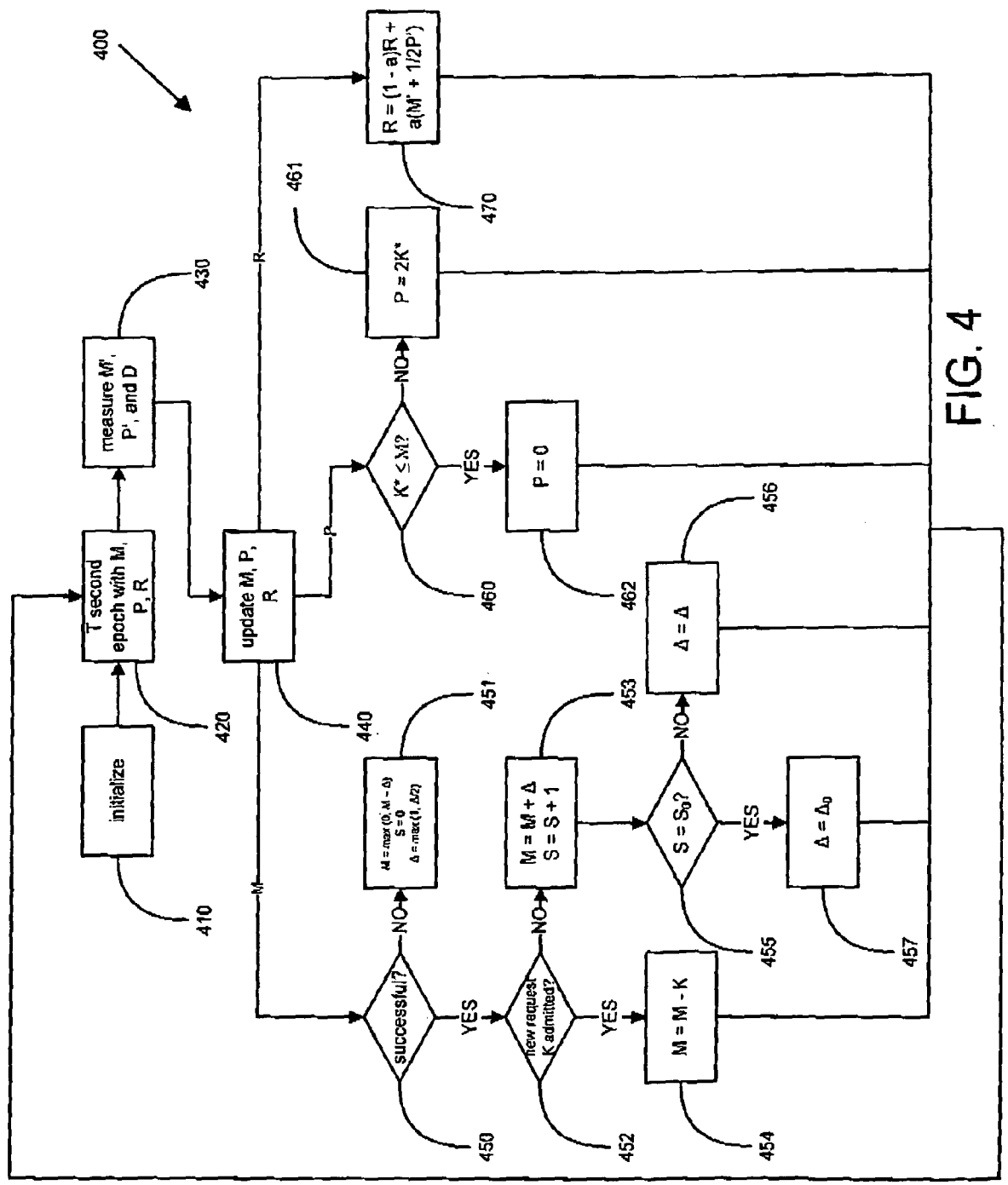
FIG. 4 is a flow diagram illustrating a method for updating parameters for access control and traffic shaping, according to a specific embodiment.

These principles of operation, which combine admission control of the critical applications and traffic shaping for the non-critical applications, are illustrated by the method 400 of FIG. 4. Briefly and with reference to FIG. 3, the admission control module 314 admits new critical applications only when the channel has enough residual available bandwidth. The traffic shaper module 316 limits the activity of the non-critical applications by limiting the number of non-critical packets that the access point 300 sends to the wireless clients 304. Most non-critical applications use the Transmission Control Protocol (TCP) that implements an end-to-end window congestion control scheme. Using such a scheme, the client transmissions are limited by the packets they get from the Access Point. The update module 330 determines the residual bandwidth that can be made available either for admitting new critical applications or for increasing the amount of traffic from non-critical applications. The update module 330 monitors the performance of the channel to determine that residual bandwidth. Specifically, the update module 330 observes the number of packets that the access point 300 can transmit in addition to the packets from the admitted critical applications. These additional packets are either non-critical packets that the access point 300 sends to clients or, if it does not need to send sufficiently many such packets, probe packets. The access point 300 sends probe packets only when the channel is so lightly utilized that there are not enough measurements to determine the residual available bandwidth. Accordingly, the probe traffic is unobtrusive.

Referring again to FIG. 4 and with reference to FIG. 3, an embodiment of an update algorithm is described. Table 1 provides a listing of the symbols used and an explanation of each symbol. The method 400 begins at step 410, with an initialization of control parameters M, P, and R. The control module 310 initializes the values of M, P, and R as well as values of Δ, P, and S. For example, $\Delta=\Delta_0$, $P=50$, and $S=0$. At step 420, the access point 300 transmits packets for a T second epoch using the parameters M, P, and R. At step 430, the update module 330 measures M', P' and D. Based on these measurements, at step 440 the update module 330 updates the values of M, P, and R at steps 450, 460, and 470, respectively.

At step 450, the update module 330 performs a check to determine whether the last T second epoch was successful. The T second epoch is deemed successful if $M' \geq M$ and $D=0$. That is, if the MAC module 320 successfully sent at least as M packets and if no high-priority packets experienced a delay of more than t, the epoch is deemed successful. If the epoch is not successful, the method proceeds to step 451. At step 451, the update module 330 decreases the value of M by Δ so that $M=\max(0, M-\Delta)$ (i.e., the greater of 0 and M−Δ so that M does not take on a negative value), resets the counter S to zero so that $S=0$, and decreases the value of Δ by a factor of 2 so that $\Delta=\max(1, \Delta/2)$ (i.e., the greater of 1 and Δ/2 so that Δ is always at least 1). S represents the number of consecutive successful epochs, so it is reset to zero at step 451, while the number of low-priority packets M is decreased for the next T-second epoch, and also decreases the change in M (i.e., Δ) by a factor of 2. If the epoch is deemed to be successful at step 450, the method proceeds to step 452. At step 452, the update module 330 performs a check to determine whether a new critical application requiring bandwidth K may be admitted by the admission control module 314. If so, at step 454 the update module 330 decreases the value of M by K, so that $M=M-K$. Otherwise, at step 453, the update module increases the value of M by Δ, so that $M=M+\Delta$, and increments the counter S by 1, so that $S=S+1$. At step 455, the update module 330 performs a check to determine whether $S=S_0$. $S_0$ represents a number of successive T-second epochs after which the update module 330 automatically increases the change in M (i.e., Δ). If S is not equal to $S_0$, at step 456, the update module 330 does not update Δ. Otherwise, at step 457 the update module 330 updates the value of Δ, so that $\Delta=\Delta_0$.

At step 460, the update module performs a check to determine whether $K^*$, the largest observed value of K, is less than or equal to M'. If $K^* \leq M'$, then at step 462 the update module 330 updates the value of P so that $P=0$. When $K^* \leq M'$, then the admission control module 314 can admit a new critical application requiring $K^*$ packets. Accordingly, the probe generator 318 does not send any probe packets to the high-priority queue of the MAC module 320. If at step 460, $K^*>M$, then at step 461 the update module 330 updates the value of P so that $P=2K^*$. Since traffic is generally symmetric, the $K^*$ packets (if admitted) would generate $K^*$ packets from the wireless clients 304, imposing an additional load of $2K^*$ packets on the channel. But since the K* packets are not admitted, and since the P probe packets do not generate additional packets from the wireless clients 304, the update module 330 sets the value of P for the next T-second epoch to twice the value of K*.

At step 470, the update module 330 updates the value of R, which is a determination of the residual bandwidth. The update module updates R so that $R=(1-\alpha)R+\alpha(M'+\frac{1}{2} P')$, where $\alpha \epsilon (0, 1)$ and is a fixed constant. A typical value is $\alpha=0.01$.

Following updates at steps 451, 452, 456, 457, 461, 426, and 470, the method 400 returns to step 420 and the control module 310 operates using the newly updated control parameters M, P, and R.

The algorithm presented in FIG. 4 may be modified in a number of ways. In one embodiment, for example, instead of defining D as the number of high-priority packets that experience a delay larger than some threshold, the update module 330 may count the number D of high-priority packets that encounter a queue-occupancy larger than a given value upon entering it. In another embodiment, the traffic shaper 316 may send low-priority packets to the MAC module 320 only when the high-priority queue is empty, in a procedure similar to that used for the probe packets. In yet another embodiment, the value of K* can be defined to be the largest request over a given time interval. As can be appreciated, M, P, and R may be updated according to formulas other than those illustrated in FIG. 4. In updating the value of M at step 451, for example, the update module 330 may decrease Δ by a fixed amount rather than by a multiplicative factor. In another example, at step 457 the update module 330 may increase Δ by an additive amount each time that S reaches $S_0$ instead of being reset to $\Delta_0$.

situation is the delivery of IPTV over a DSL line that is shared by other applications. Thus, the systems and methods described herein may apply more generally to a shared transmission medium, including wired channels and wireless channels.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed:

1. A method comprising:
   measuring, by an access point, the performance of a shared wireless channel by making direct measurements of: (a) a number of packets of both critical traffic and non-critical traffic transmitted during a time period, (b) transmission metrics associated with the transmission of those packets during the time period, and (c) a number of packets of critical traffic that experienced a transmission delay exceeding a predetermined amount of time during the time period, these direct measurements being made in order to estimate a residual bandwidth for a subsequent time period, wherein said residual bandwidth is in terms of a number of critical transmissions possible for the subsequent time period; and
   adjusting, by the access point, control parameters for transmission of critical traffic and non-critical traffic for the subsequent time period based on each of the direct measurements (a)-(c) so as to maintain a quality of service for critical traffic generated by critical applications and to optimize utilization of any residual bandwidth.

2. A method according to claim 1, wherein the shared wireless channel uses a protocol compliant with one of IEEE 802.11a (1999) standard, IEEE 802.11b (1999) standard, IEEE 802.11c (2001) standard, IEEE 802.11d (2001) standard, IEEE 802. 11e (2005) standard, IEEE 802.11g (2003) standard, IEEE 802.11h (2004) standard, IEEE 802. 11i (2004) standard, and IEEE 802.11j (2004) standard.

TABLE 1

Symbols and explanations

| Symbol | Explanation |
| --- | --- |
| M | The traffic generator sends one low-priority packet to the MAC every T/M seconds |
| M' | The number of low-priority packets that the MAC sent over the channel during the last T-second epoch |
| P | The probe generator sends up to P probe packets to the MAC in a given T-second epoch, but only when the high-priority queue is empty |
| P' | The number of probe packets that the MAC sent over the channel during the last T-second epoch |
| D | The number of high-priority packets that experienced a delay larger than t during the last T-second epoch (a typical value of t is 10 ms); |
| R | Estimate of available capacity of the channel, measured in number of additional critical packets that the AP can send in a T-second epoch |
| Δ | Step size for adjustment of M; the initial value of Δ is Δ0 whose representative value is 50 |
| S | The number of consecutive successful T-second epochs; an epoch is successful if D = 0 and M' ≧ M |
| $S_0$ | Threshold for S after which the system increases M (a typical value is $S_0$ = 10) |
| K | Requested bandwidth for a new critical application, in packets per T seconds, calculated from the TSPEC in the call request; |
| K* | Largest value of K observed. The system constantly checks whether it could accept such a request. |

The systems and methods described herein in the context of the IEEE 802.11 standards may also be applied to other technologies. For instance, the same basic approach to adaptive control can be used to adapt the scheduler of an IEEE 802.16 base station or of a DOCSIS cable head-end station. More generally, the direct adaptive control method described herein applies to the scheduling of multiple classes of packets to protect the quality of critical services when they compete for bandwidth with other services. An example of such a 3. A method according to claim 1, further comprising determining the residual bandwidth for the subsequent time period based on direct measurements of a number of packets of the critical traffic, including probe packets not generated by critical applications, transmitted during the time period.

4. A method according to claim 1, wherein the non-critical traffic includes packets generated by critical applications but transmitted with a lower associated quality of service than for the critical traffic.

5. A method according to claim 1, wherein the transmission metrics include one or more of delay metrics, loss metrics, and queue occupancy.

6. A method according to claim 1, wherein adjusting control parameters for transmission of critical traffic and non-critical traffic involves allocating a portion of available bandwidth each to critical applications and to non-critical applications in order to balance traffic based on a measure of fairness or a predetermined allocation.

7. A method according to claim 1, wherein adjusting control parameters for transmission of critical traffic includes allowing a new critical application to transmit critical packets if its bandwidth requirement is less than or equal to the residual bandwidth for the subsequent time period.

8. A method according to claim 1, wherein adjusting control parameters for non-critical traffic includes adjusting the number of non-critical packets allowed to be sent during the subsequent time period.

9. A method according to claim 3 wherein adjusting control parameters for transmission of critical traffic includes adjusting the number of probe packets to be sent during the subsequent time period.

10. A method comprising:
measuring, by an access point, the performance of a shared transmission medium by making direct measurements of: (a) a number of packets of both critical and non-critical traffic transmitted during a time period, (b) transmission metrics associated with the transmission of those packets during the time period, and (c) a number of packets of critical traffic that experienced a transmission delay exceeding a predetermined amount of time during the time period, these direct measurements being made in order to estimate residual bandwidth for a subsequent time period, wherein said residual bandwidth is in terms of a number of critical transmissions possible for the subsequent time period; and
adjusting, by the access point, control parameters for transmission of critical traffic and non-critical traffic for the subsequent time period based on each of the direct measurements (a)-(c) so as to maintain a quality of service for critical traffic generated by critical applications and to optimize utilization of any residual bandwidth;
wherein the number of packets of critical traffic transmitted during the time period includes probe packets not generated by critical applications.

11. A method according to claim 10, wherein the shared transmission medium is either wireless or wired and uses a protocol compliant with one of IEEE 802.11a (1999) standard, IEEE 802.11b (1999) standard, IEEE 802.11c (2001) standard, IEEE 802.11d (2001) standard, IEEE 802,11e (2005) standard, IEEE 802.11g (2003) standard, IEEE 802.11h (2004) standard, IEEE 802.11i (2004) standard, IEEE 802.11j (2004) standard, IEEE 802.16 networks, and DOCSIS networks.

12. A method according to claim 10, wherein the non-critical traffic includes packets generated by critical applications but transmitted with a lower associated quality of service than for the critical traffic.

13. A method according to claim 10, wherein the transmission metrics include one or more of delay metrics, loss metrics, and queue occupancy.

14. A method according to claim 10, wherein adjusting control parameters for transmission of critical traffic and non-critical traffic involves allocating a portion of available bandwidth each to critical applications and to non-critical applications in order to balance traffic based on a measure of fairness or a predetermined allocation.

15. A method according to claim 10, wherein adjusting control parameters for transmission of critical traffic includes allowing a new critical application to transmit critical packets if its bandwidth requirement is less than or equal to the residual bandwidth for the subsequent time period.

16. A method according to claim 10, wherein adjusting control parameters for non-critical traffic includes adjusting the number of non-critical packets allowed to be sent during the subsequent time period.

17. A method according to claim 10, wherein adjusting control parameters for transmission of critical traffic includes adjusting the number of probe packets to be sent during the subsequent time period.

18. A system comprising:
a control module operative to control transmission of critical traffic and non-critical traffic over a shared wireless channel;
a media access control module operative to transmit packets of critical traffic and non-critical traffic over the shared wireless channel; and
an update module operative to:
make direct measurements of the number of packets of both critical traffic and non-critical traffic transmitted during a time period;
make direct measurements of transmission metrics associated with transmission of the packets during the time period;
make direct measurements of a number of packets of critical traffic that experienced a transmission delay exceeding a predetermined amount of time during the time period;
estimate residual bandwidth available over the shared transmission medium for a subsequent time period based on each of the direct measurements, wherein said residual bandwidth is in terms of a number of critical transmissions possible for the subsequent time period; and
adjust control parameters to be used by the control module to control transmission of critical traffic and non-critical traffic during the subsequent time period so as to maintain a quality of service for critical traffic generated by critical applications and to optimize utilization of any residual bandwidth.

19. A system according to claim 18, wherein the shared wireless channel uses a protocol compliant with one of IEEE 802.11a (1999) standard, IEEE 802.11b (1999) standard, IEEE 802.11c (2001) standard, IEEE, 802.11d (2001) standard, IEEE 802. 11e (2005) standard, IEEE 802.11g (2003) standard, IEEE 802.11h (2004) standard, IEEE 802.11i (2004) standard, and IEEE 802.11j (2004) standard.

20. A system according to claim 18, wherein the critical traffic includes probe packets not generated by critical applications.

21. A system according to claim 18, wherein the non-critical traffic includes packets generated by critical applications but transmitted with a lower associated quality of service than for critical traffic.

22. A system according to claim 18, wherein the transmission metrics include one or more of delay metrics, loss metrics, and queue occupancy.

23. A system according to claim 18, wherein the update module is operative to adjust control parameters for transmission of critical traffic and non-critical traffic by allocating a portion of available bandwidth each to critical applications and to non-critical applications in order to balance traffic based on a measure of fairness or a predetermined allocation.

24. A system according to claim 18, wherein the update module is operative to adjust control parameters for transmission of critical traffic by allowing a new critical application to transmit critical packets if its bandwidth requirement is less than or equal to the residual bandwidth for the subsequent time period.

25. A system according to claim 18, wherein the update module is operative to adjust control parameters for non-critical traffic by adjusting a number of non-critical packets allowed to be sent during the subsequent time period.

26. A system according to claim 20, wherein the update module is operative to adjust control parameters for transmission of critical traffic by adjusting the number of probe packets to be sent during the subsequent time period.

27. A system according to claim 20, further comprising a probe generator operative to generate probe packets.

* * * * *